(12) United States Patent
Chaudhari et al.

(10) Patent No.: US 12,173,805 B2
(45) Date of Patent: Dec. 24, 2024

(54) PRESSURE OPERATED FLUID VALVE WITH CONFIGURABLE DIAPHRAGM ARRANGEMENT

(71) Applicant: HD Fire Protect Private Limited, Mumbai (IN)

(72) Inventors: Kiran Chaudhari, Thane (IN); Harish Dharamshi, Mumbai (IN)

(73) Assignee: HD Fire Protect Private Limited, Mumbai (IN)

( * ) Notice: Subject to any disclaimer, the term of this patent is extended or adjusted under 35 U.S.C. 154(b) by 12 days.

(21) Appl. No.: 18/207,191

(22) Filed: Jun. 8, 2023

(65) Prior Publication Data

US 2024/0280182 A1 Aug. 22, 2024

(30) Foreign Application Priority Data

Feb. 16, 2023 (IN) .............................. 202321010452

(51) Int. Cl.
*F16K 15/00* (2006.01)
*F16K 15/14* (2006.01)

(52) U.S. Cl.
CPC ................. *F16K 15/1441* (2021.08)

(58) Field of Classification Search
CPC .................................................. F16K 15/1441
See application file for complete search history.

(56) References Cited

U.S. PATENT DOCUMENTS

| | | | | |
|---|---|---|---|---|
| 2013/0283884 A1* | 10/2013 | Beroz | ............... | B01L 3/0293 |
| | | | | 73/864.11 |
| 2023/0266280 A1* | 8/2023 | May | ................... | G01N 30/32 |
| | | | | 73/23.42 |

* cited by examiner

Primary Examiner — Kevin R Barss

(57) ABSTRACT

A pressure operated fluid valve (10) having a configurable diaphragm arrangement (100) consisting of a flexible profile (110), a sealing portion (130) having a metallic insert (131) encapsulated in a natural or a synthetic rubber, the sealing portion (130) having a combination profile (140), a pressure management profile (150) on an inside curvilinear surface (114) of the flexible profile (110); a clear peripheral space (14) between an outer surface (113) of the clapo-diaphragm (100) and inner circumferential surface (24) of the main fluid flow chamber (20) is maintained to a non-zero value, during an open and close operation of the pressure operated fluid valve (10) throughout its life cycle; further comprises a secondary pressure management assembly (170) disposed between the first anchor (57) in the diaphragm cover (50) and the second anchor (137) in the configurable diaphragm arrangement (100).

14 Claims, 23 Drawing Sheets

PRESSURE OPERATED FLUID VALVE WITH CONFIGURABLE DIAPHRAGM ARRANGEMENT

FIELD OF INVENTION

The present invention relates to a fluid control valve, particularly to a pressure operated valve. More particularly, the present invention relates to an inventive diaphragm for the pressure operated fluid valve.

BACKGROUND OF INVENTION

Valves are essential part of modern human lifestyle. Valves as generally understood are opened and closed by a mechanical or electromechanical arrangement, generally external to the valve.

Fluid control valve under discussion here, on the other hand, are differential pressure operated and therefore do not have an associated direct actuation or an operating arrangement for closing and opening of the valve.

Such valves are diaphragm based, wherein the diaphragm has a requisite flexibility and stiffness to open/close and seal when closed. Such valves are expected to supply water in abundance when fire breaks out, and hence the term deluge is used at times. CN209959897 discloses one such diaphragm operated Y-shaped deluge valve having a diaphragm housed in a valve body for use in water spray fire extinguishing systems. EP3855050A1 discloses a straightaway deluge valve having a piston operated diaphragm housed in a valve body and a valve cover. WO2018111677A1 also discloses a diaphragm disposed between a cover portion and a body portion. CN107575583 discloses another diaphragm valve.

Such valves depend significantly on construction suitability of diaphragm to meet various field requirements, particularly operating pressure and pressure pulsations.

The present invention comprehensively addresses this growing need.

SUMMARY OF INVENTION

The present invention is a pressure operated fluid valve with a configurable diaphragm arrangement, also termed as a "clapo-diaphragm".

The pressure operated fluid valve comprises a main fluid flow chamber and a diaphragm cover. The pressure operated fluid valve, when closed, forms three chambers—an upstream side, a downstream side, and a diaphragm side.

The configurable diaphragm arrangement comprises an integrated flexible profile, sealing portion, and pressure management profile, molded in a natural or a synthetic rubber. The flexible profile forms a flexible link allowing the sealing portion to move up and down in the main fluid flow chamber. The sealing portion is rigid, particularly due to a metallic insert encapsulated therein. A first curvatured profile, a second curvatured profile, a third curvatured profile and a fourth curvatured profile are an outwardly convex profiles. The fourth curvature profile has a peripheral flat end. Such construction collectively is a combination convex profile. The pressure operated fluid valve as per the present invention opens and closes by a linear travel of the sealing portion of the clapo-diaphragm, the linear travel determined by an internal height, which in turn is a combination of the gate cover and the gate height. A first portion and a second portion forms a gapless contiguous sealing when the valve is fully open. An inside curvilinear surface of the flexible profile of the Clapo-Diaphragm is provided with a plurality of pressure management profiles. In a preferred embodiment, the pressure management profiles are a plurality of substantially trapezoidal cross sectional ribs, an either end of each rib tapering out to merge with the inside curvilinear surface of the diaphragm. These trapezoidal cross sectional ribs (provide an additional resistive force against fluidic pressure so as to achieve valve opening at a high differential pressure.

Under operation, the fluidic pressure/pressure pulsations Pr results into a tendency of the combination convex profiled to transiently bulge out to a swelled convex profile resulting into an additional force Fr on the sealing seat proportional to an interface width at the peripheral flat end of the configurable diaphragm arrangement.

A secondary pressure management assembly as per the present invention comprises a stud, a dynamic support and a compression spring with a prescribed internal diameter. The dynamic support is a hollow tubular cylinder with an internal tubular diameter, having a peripheral platform and a spiral cut all along an external tubular wall so as to threadingly retain the compression spring with the prescribed internal diameter. The stud is of a stud diameter, the stud diameter being less than the tubular diameter as prescribed. A spring assisted telescopic arrangement is formed by assembling the compression spring on the stud and the dynamic support. The secondary management assembly is disposed between the first anchor in the diaphragm cover and the second anchor in the configurable diaphragm arrangement.

The pressure operated fluid valve is provided with the secondary pressure management assembly with different compression springs as per pressure parameters of application, and importantly an active turns of any compression spring provided in a valve can be altered by increasing or decreasing engagement of corresponding numbers of turns in the spiral cut, during installation and commissioning of the valve. Also, an active length of any compression spring provided in a valve can be altered by increasing or decreasing engagement of corresponding numbers of turns in the spiral cut, during installation and commissioning of the valve. Such flexibility of changing the compression spring, and changing compressive force of the compressive spring, resulting in the manipulation of the resistive force in situ is a significant flexibility for deployment of the pressure operated fluid valve as per present invention for installations of different pressure parameters.

While a clear space between an outer surface of the configurable diaphragm and inner circumferential surface of the main fluid flow chamber is present in order to reduce operational friction and wear, the clapo-diaphragm does move up and down in a micro zig-zag manner due to pressure pulsations, and thus there exists a possibility of the diaphragm getting excessively wear and or getting stuck in one of the positions. On the other hand, an attempt to completely prevent such pulsating and or skewed movement can also result in excessive stresses in the clapo-diaphragm resulting in wear and reducing its operational life. The present invention finds a solution by permitting a minimum degree of freedom of the stud in the dynamic support, which gradually reduces as the stud telescopes in the dynamic support. In other words, while the secondary pressure management assembly does restrict a skewed movement during the closing and the opening of the pressure operated fluid valve as per the present invention, the intentional and prescribed "play" between the dynamic support and the stud acts as a reliever of undue stresses. The stud diameter being less than the tubular diameter, as prescribed, restricts to a prescribed degree an angular freedom of the sealing portion of the configurable diaphragm arrangement. At the same time, the stud diameter being less than the tubular diameter, as prescribed, permits a lateral shift of the stud inside the dynamic support.

With such engineered coordinated pressure operated fluid valve with coordinated diaphragm arrangement augmented with the secondary pressure management assembly results in a complete opening and proper closing of the valve over an extended life and with low maintenance services, eventually reducing cost over life cycle of the installation. The valve can be re-calibrated for enhanced system pressure due to upgradations and expansions of installations, further adding economic significance of the invention.

DETAILED DESCRIPTION OF INVENTION

The present invention shall now be described with the help of accompanying drawings. It is to be expressly understood that the present invention can have several variations around the inventive concept and the description should be considered only for understanding and not limiting the invention in any way.

Figure 1:
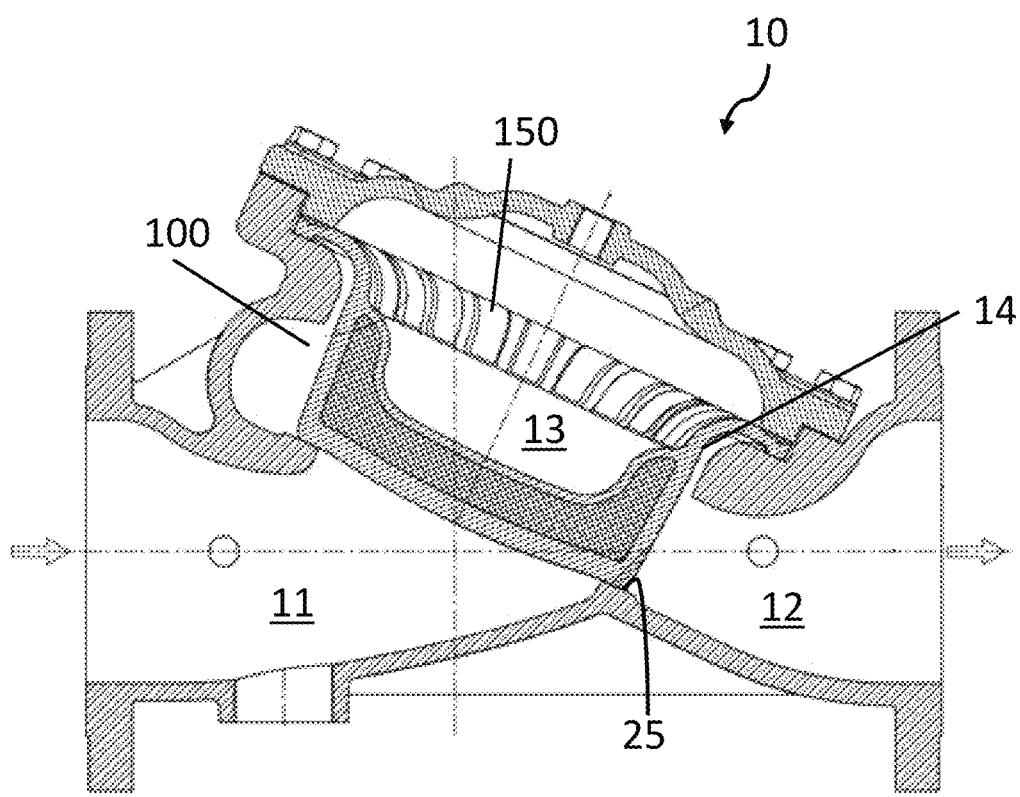
FIG. 1 is a sectional front view of a pressure operated fluid valve as per present invention.

FIG. 1, the present invention is a pressure operated fluid valve (10) with a configurable diaphragm arrangement (100), also termed as a "clapo-diaphragm".

Figure 2:
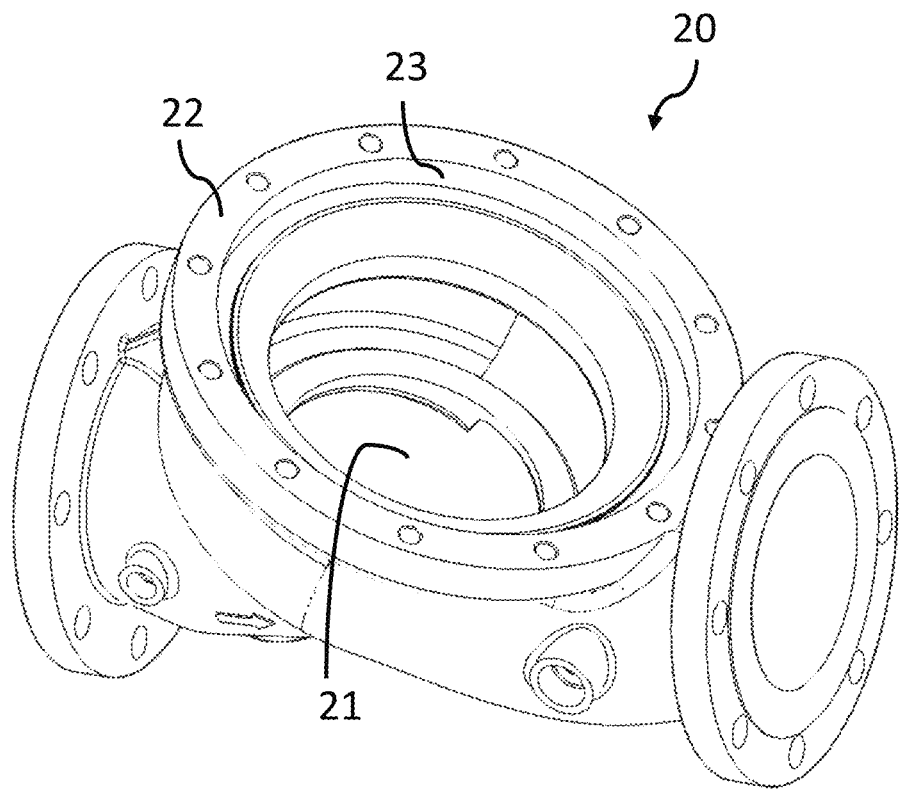
FIGS. 2 and 3 is a perspective view of a valve main fluid flow chamber and a diaphragm cover respectively.
Figure 3:
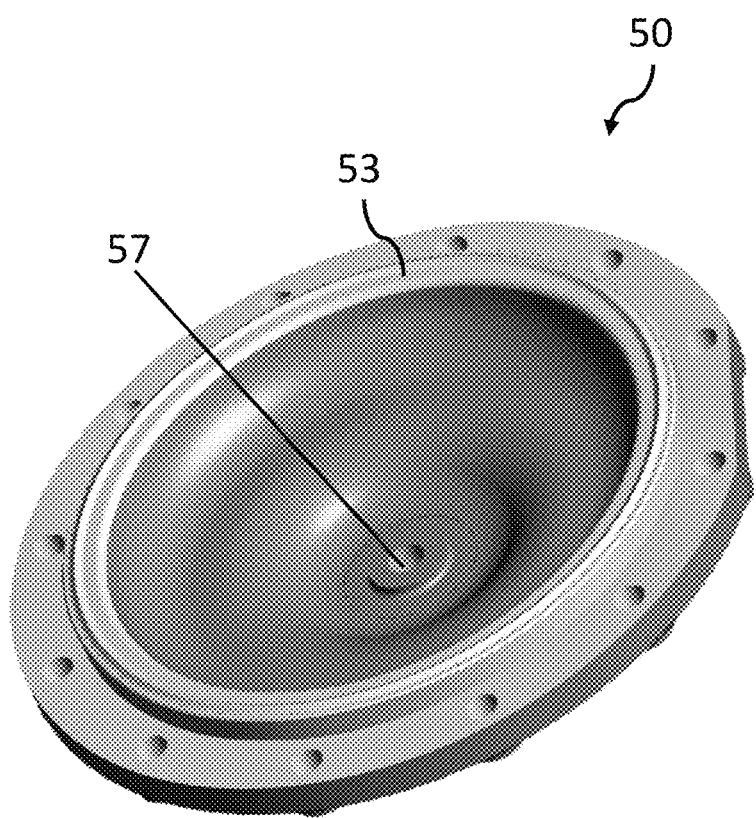

FIG. 2, 3, the pressure operated fluid valve (10) comprises a main fluid flow chamber (20) and a diaphragm cover (50). The main fluid flow chamber (20) has a diaphragm gate (21), a seat (22) and a first holder profile (23). The diaphragm cover (50), a first anchor (57), a second holder profile (53) and a pressure equalization path (not shown). The pressure operated fluid valve (10), when closed, forms three chambers:

An upstream side (11)
A downstream side (12)
A diaphragm side (13)

Figure 4:
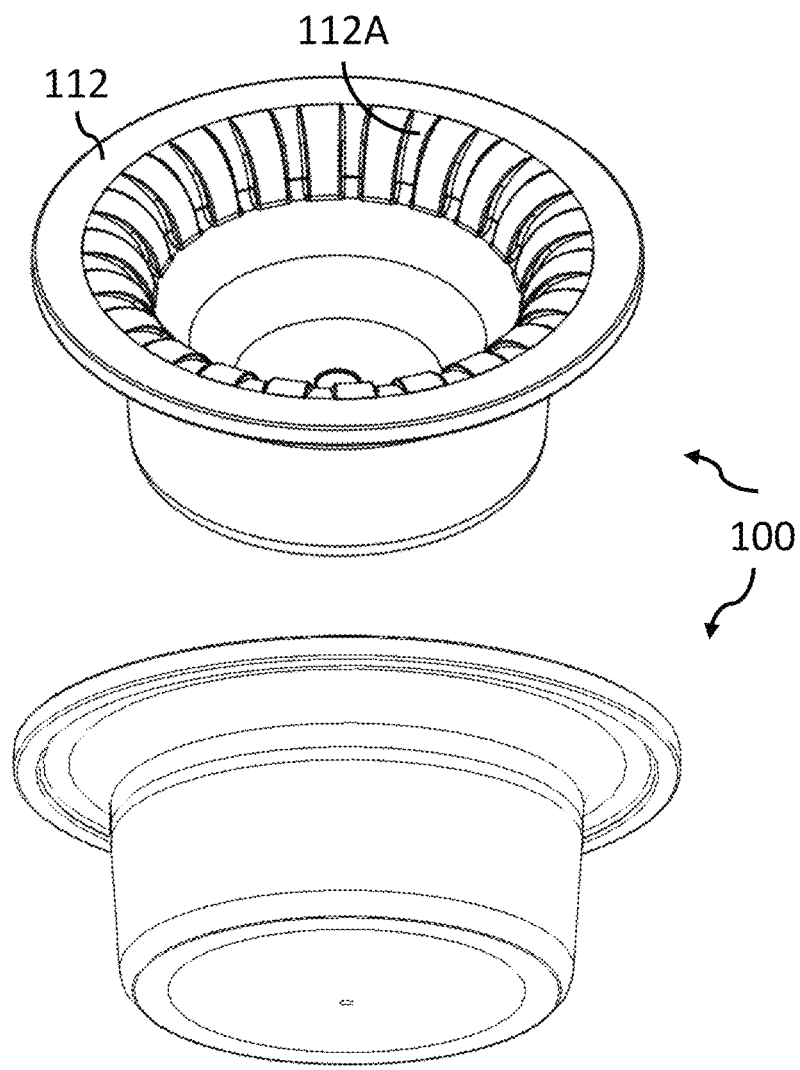
FIG. 4 are two perspective views of a configurable diaphragm arrangement.
Figure 5:
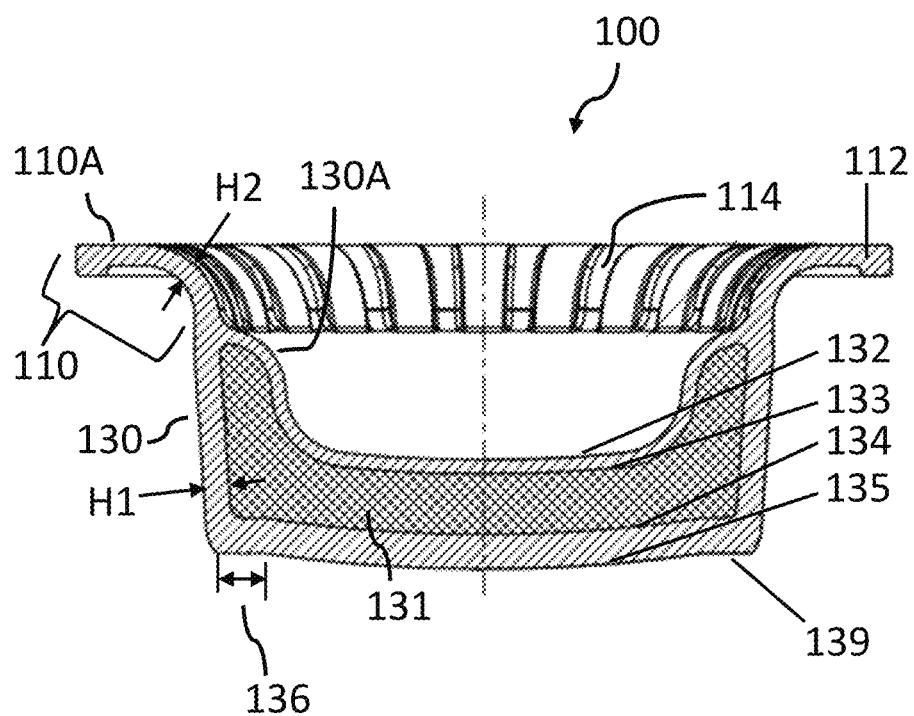
FIGS. 5 and 6 are sectional views of the configurable diaphragm arrangement.
Figure 6:
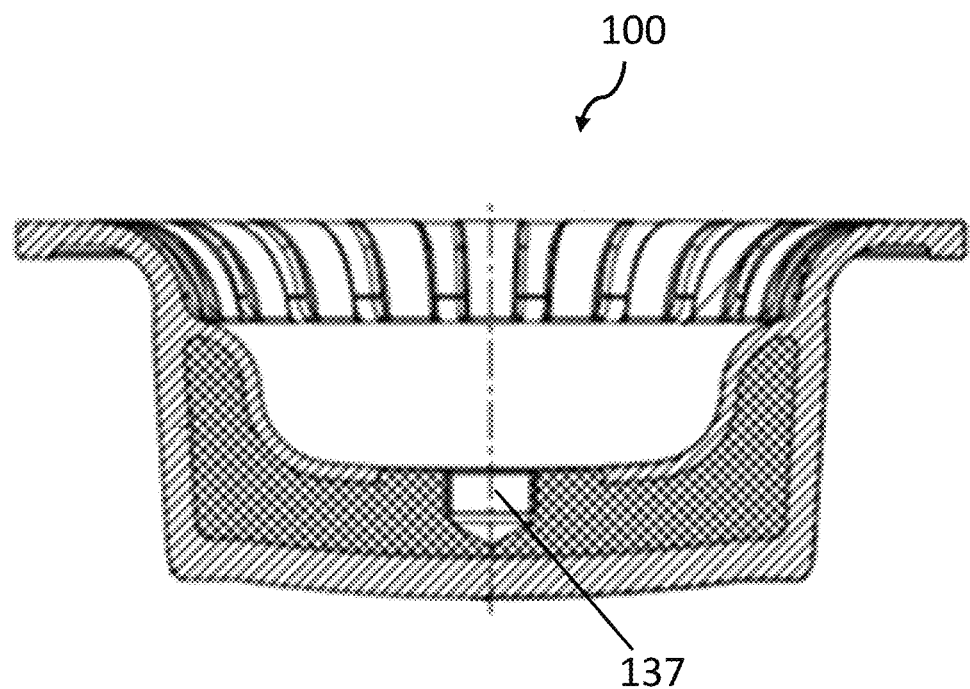

FIG. 4, 5, 6, 7, the configurable diaphragm arrangement (100) comprises an integrated
Flexible profile (110),
Sealing portion (130), and
Pressure management profile (150), molded in a natural or a synthetic rubber (111).

The flexible profile (110) forms a flexible link allowing the sealing portion (130) to move up and down in the main fluid flow chamber (20).

The sealing portion (130) is rigid, particularly due to a metallic insert (131) encapsulated therein. A first curvatured profile (132), a second curvatured profile (133), a third curvatured profile (134) and a fourth curvatured profile (135) are an outwardly convex profiles. The fourth curvature profile (135) has a peripheral flat end (139). Such construction collectively is a combination convex profile (140).

Figure 8:
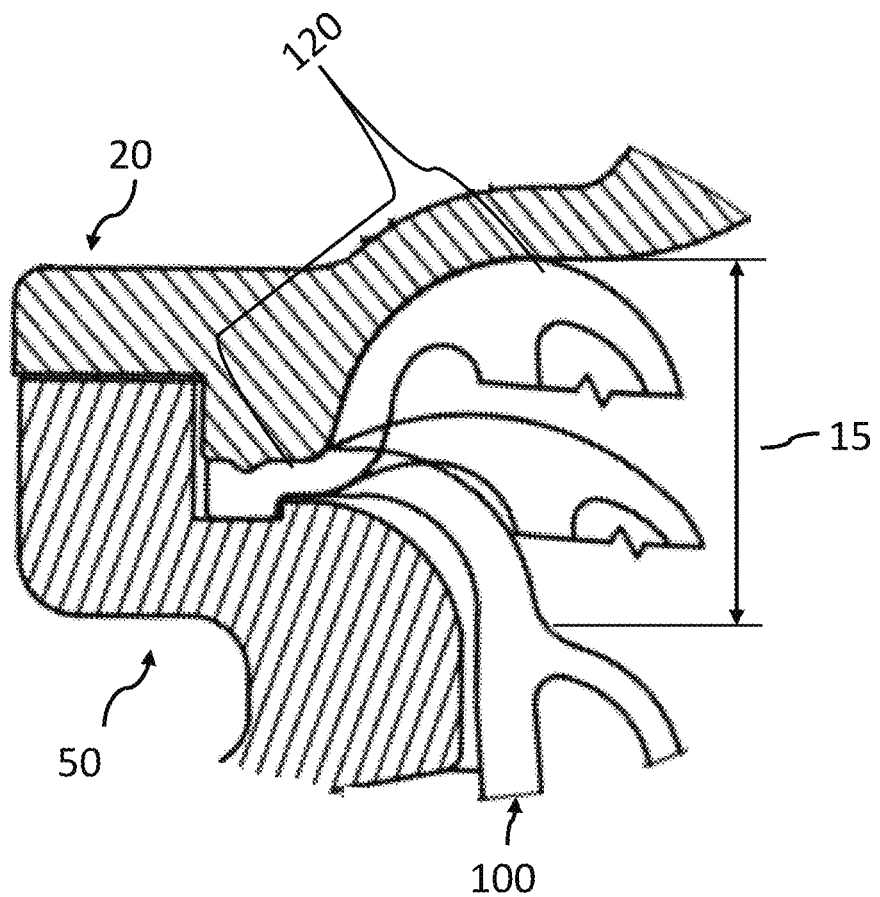

The configurable diaphragm arrangement (100), or the clapo-diaphragm (100) is disposed in the main fluid flow chamber (20) and a first end (112) of the flexible profile (110) is securely trapped between the first holder profile (23) and the second holder profile (53) such that there is a clear peripheral space (14) between an outer surface (113) of the clapo-diaphragm (100) and inner circumferential surface (24) of the main fluid flow chamber (20). The pressure operated fluid valve (10) as per the present invention opens and closes by a linear travel (15) of the sealing portion of the clapo-diaphragm, the linear travel determined by an internal height, which in turn is a combination of the gate cover and the gate height. A first portion (110A) and a second portion (130A) forms a gapless contiguous sealing (120) when the valve is fully open. FIG. 8.

Figure 7:
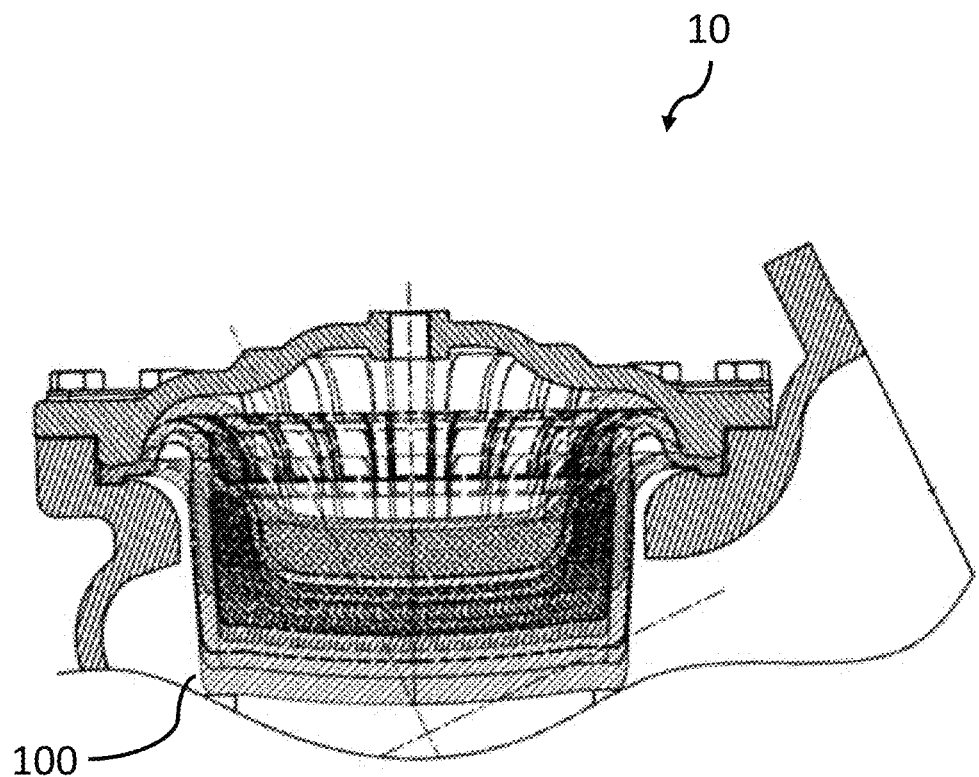
FIGS. 7 and 8 are sectional views showing fully and partially respectively, the configurable diaphragm arrangement in close, open and interim positions.
Figure 9:
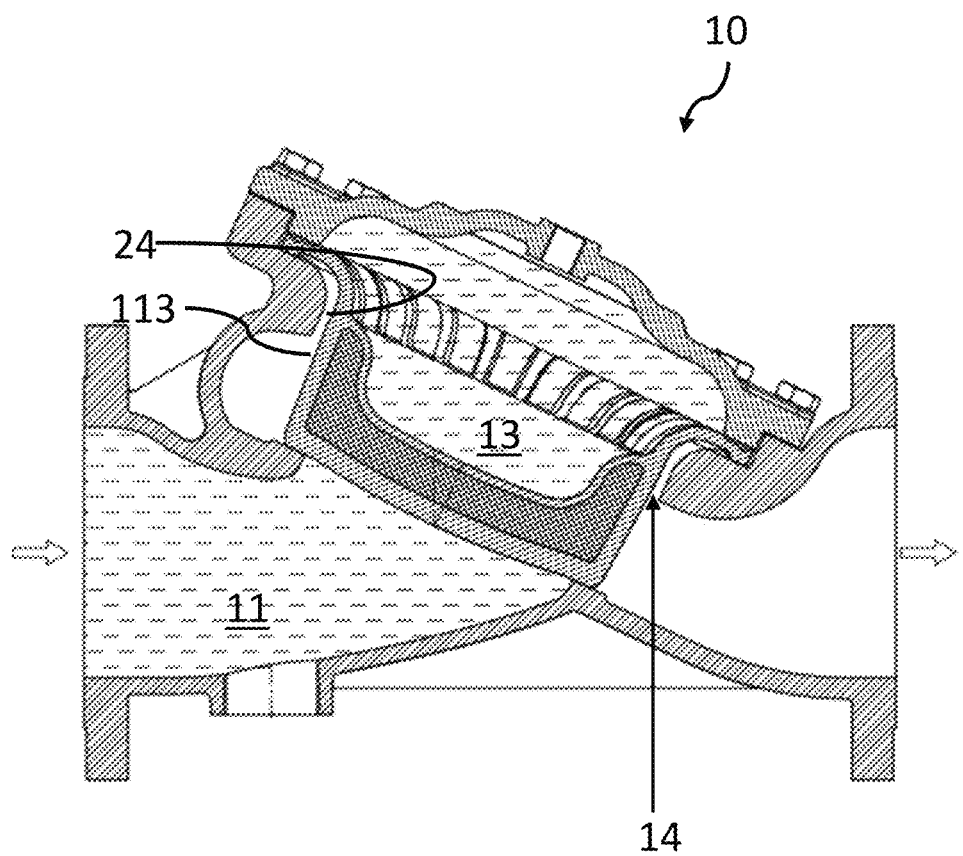
FIGS. 9 and 10 are sectional views of the pressure operated fluid flow valve with a diaphragm side full and devoid of contents, respectively.
Figure 10:
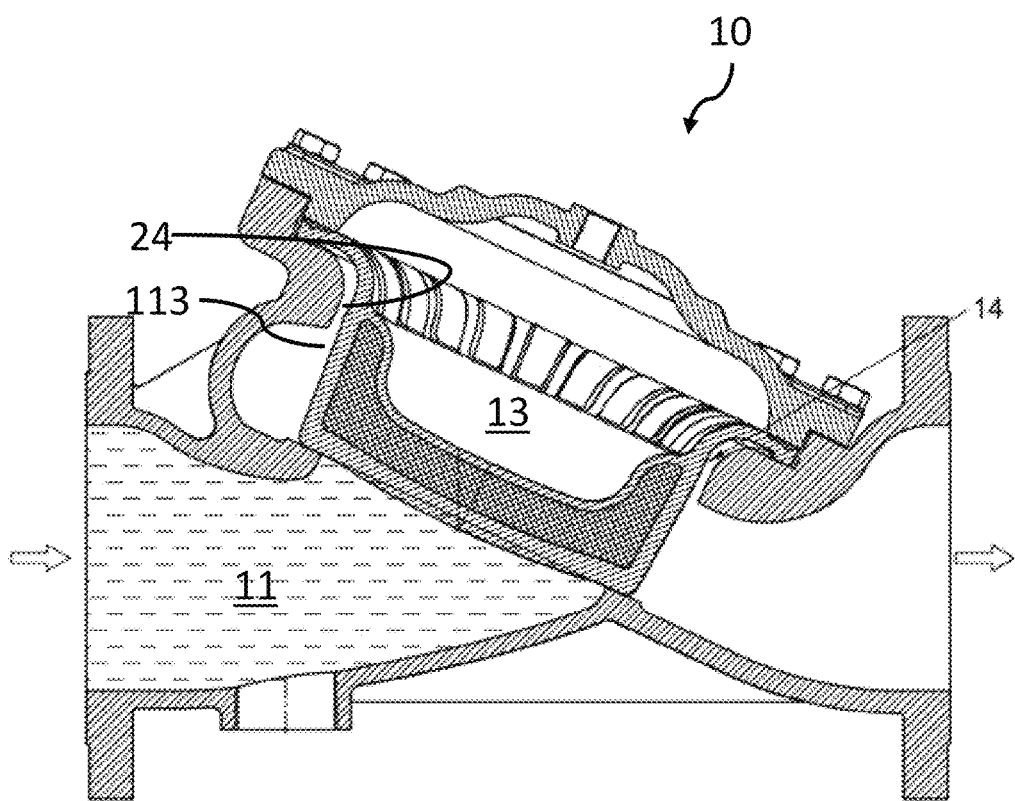

FIG. 9, the pressure operated fluid valve (10) remains closed as long as the diaphragm side (13) is filled with fluid at the same pressure as the upstream side (11). The valve opens by the diaphragm getting lifted up (FIG. 7), as soon as the diaphragm side (13) is made to "bleed" its fluidic contents. FIG. 10.

Figure 11:
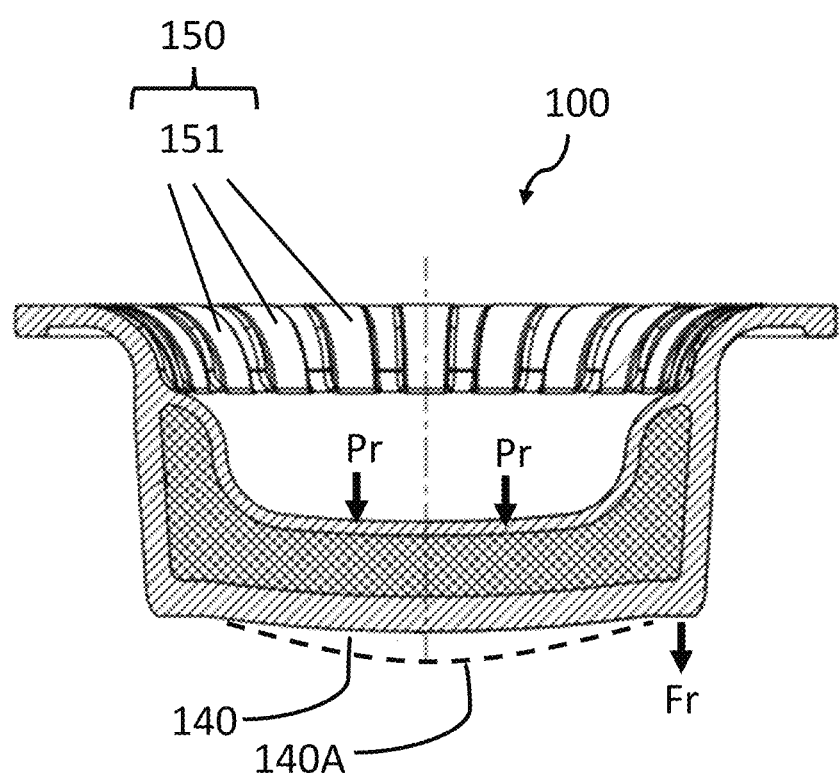
FIG. 11 is a sectional view showing a pressure management profile, while FIG. 12 gives engineering details of such profile.

FIG. 11, an inside curvilinear surface (112A) of the flexible profile (110) of the Clapo-Diaphragm is provided with a plurality of pressure management profiles (150). In a preferred embodiment, the pressure management profiles (150) are a plurality of substantially trapezoidal cross sectional ribs (151), an either end of each rib tapering out to merge with the inside curvilinear surface (112A) of the diaphragm. These trapezoidal cross sectional ribs (151) provide an additional resistive force against fluidic pressure so as to achieve valve opening at a high differential pressure.

Figure 12:
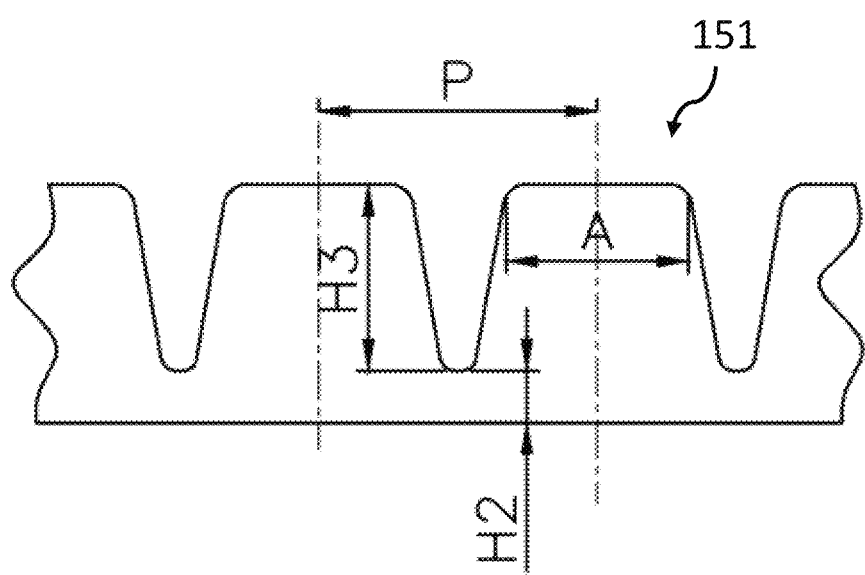

FIG. 12, an illustrative configuration of the ribs (151) is such that the pitch P of the ribs (151) is multiple of the top width A of the ribs to the order of 1 to 1.5, height H3 equal to 1 to 1.5 times of H2.

Figure 13:
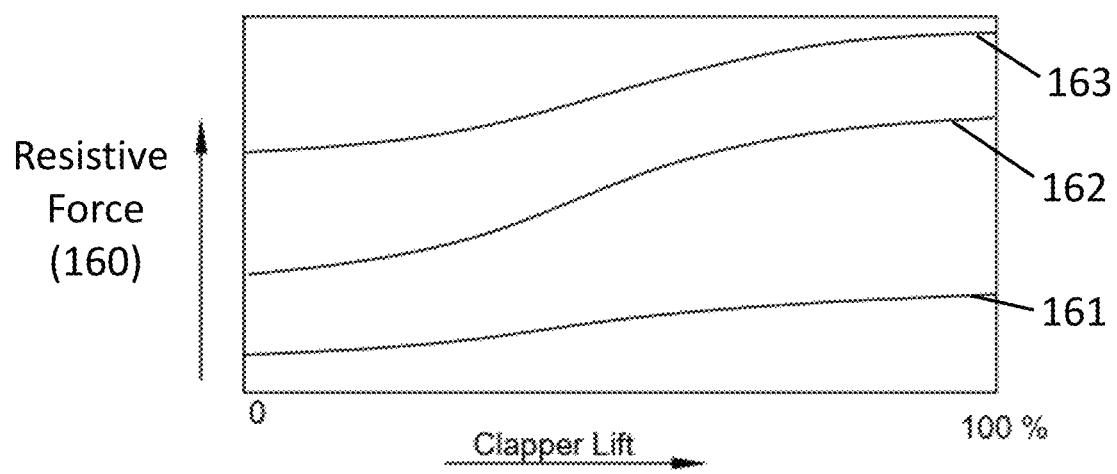
FIG. 13 is a line graph showing a repulsive force verses diaphragm lift relation.

FIG. 13, considering that while opening the pressure operated fluid valve (10), a resistive force (160) offered by the configurable diaphragm arrangement (100) as a baseline (161) for a prior art diaphragm, when the trapezoidal cross-sectional ribs (151) are provided, then the resistive force (160) changes substantially to a higher side (162), as the trapezoidal cross-sectional ribs (151) experience an uplift of the sealing portion (130) or the clapper. Further, the resistive force (160) increases (163) when the pitch of the ribs is decreased, or the thickness is H3 is increased or both simultaneously.

Figure 14:
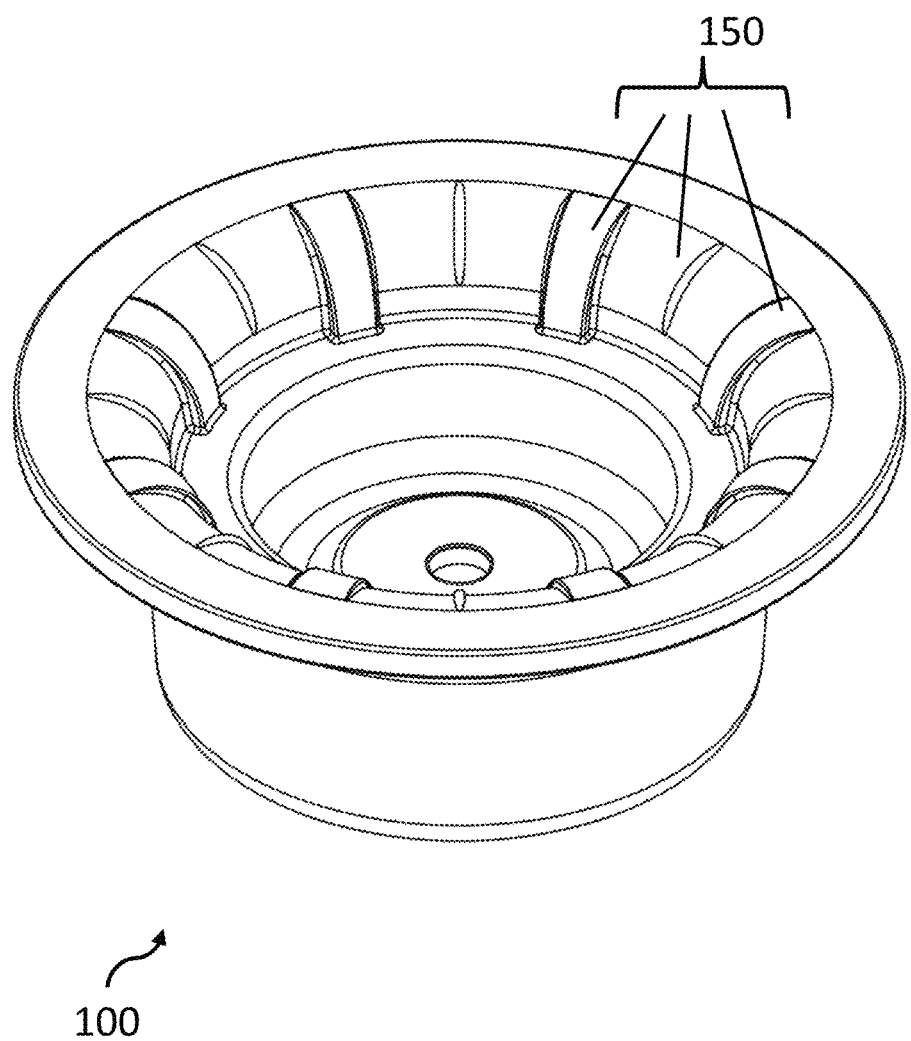
FIG. 14 is a perspective view of another embodiment of the configurable diaphragm arrangement.

FIG. 14, another alternative shape to achieve the same inventive effect of the pressure management profiles (150) is semi-circular in nature.

Figure 15:
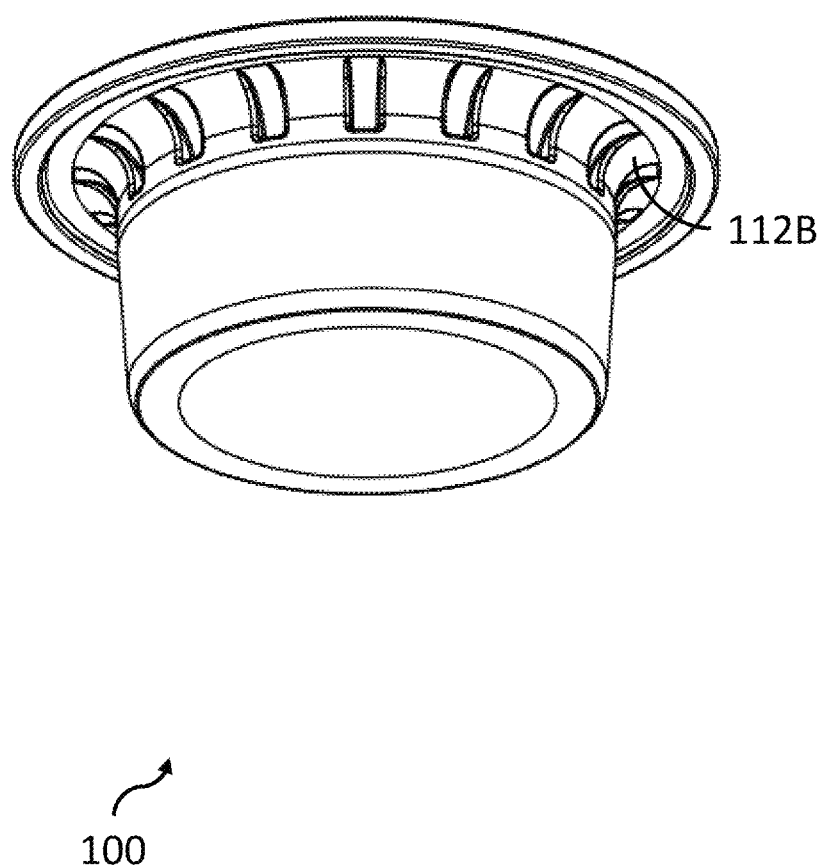
FIG. 15 is a perspective view of yet another embodiment of the configurable diaphragm arrangement, while FIG. 16 gives corresponding engineering details.

FIG. 15, as another embodiment, an outside curvilinear surface (112B) follows a profile of the trapezoidal cross-sectional ribs (151) on the inside curvilinear surface (112A), resulting into a kind of a corrugated rib profile (152). The corrugated rib profile (152) has a reduced exposed surface area likely to interact with the inner circumferential surface (24) of the main fluid flow chamber (20), resulting in relatively lesser friction and wear.

Figure 16:
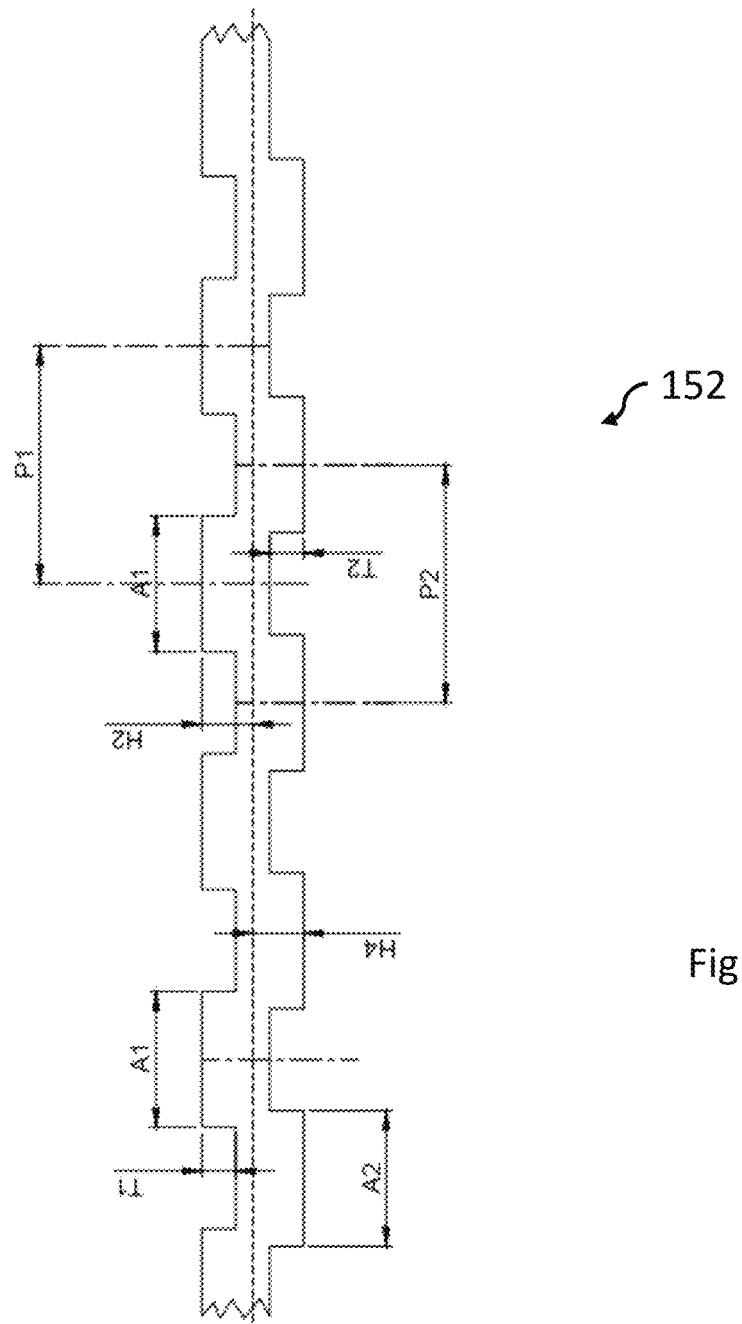

FIG. 16, an illustrative configuration of corrugated rib profile (152) is with a pitch P1 varying from A1 to twice A1, a pitch P2 varying from A2 to twice the A2, a thickness T1 varying from 0 to half of H2, a thickness T2 varying from 0 to half of a gross thickness H4, and the gross thickness H4 varying from 0 to three times the H2.

Since the present invention works on differential pressure, a NIL leak arrangement is a must, between the upstream side (11), the downstream side (12) and the diaphragm (100), and which heavily depends on and around a sealing seat (25) of the main valve body and an interface width (136) at the peripheral flat end (139) of the clapo-diaphragm (100). The clapo-diaphragm, due to its combination convex profile (140) effectively address this fundamental functional requirement. Under operation, the fluidic pressure/pressure pulsations Pr results into a tendency of the combination convex profiled to transiently bulge out to a swelled convex profile (140A) resulting into an additional force Fr on the sealing seat (25) proportional to an interface width (136) at the peripheral flat end (139) of the configurable diaphragm arrangement (100).

Fire protection valves are required to cater to situations of fire pipelines of far and wide lengths, particularly in high rise buildings and tunnels. The fire protection valves, consequently need to operate under different conditions of line pressure and corresponding pressure pulsations. The present invention caters to this requirement by the secondary pressure management assembly of the configuration diaphragm.

Figure 17:
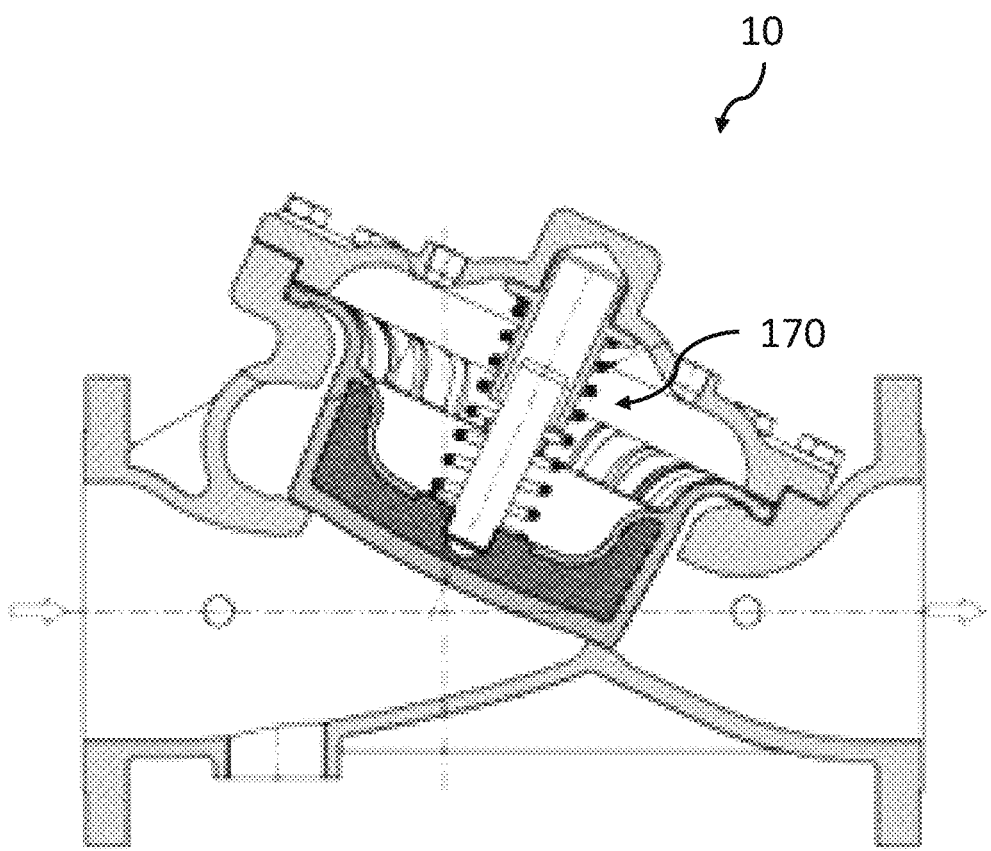
FIG. 17 is a sectional view of the pressure operated fluid valve with a secondary pressure management assembly as per present invention, while FIGS. 18-20 give details of its constituents.
Figure 18:
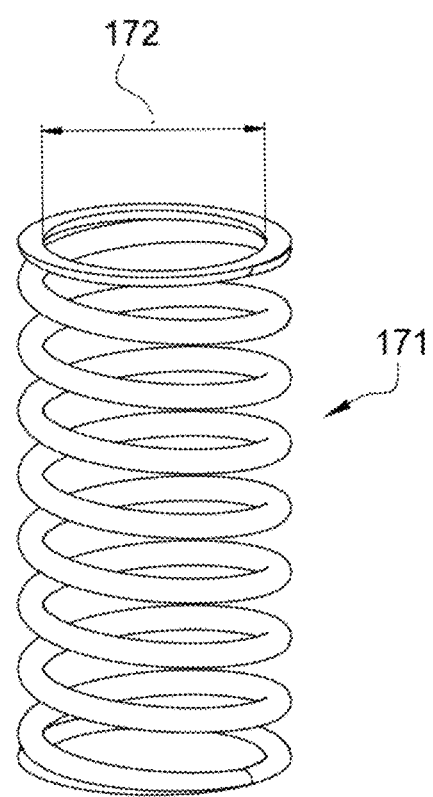
Figure 19:
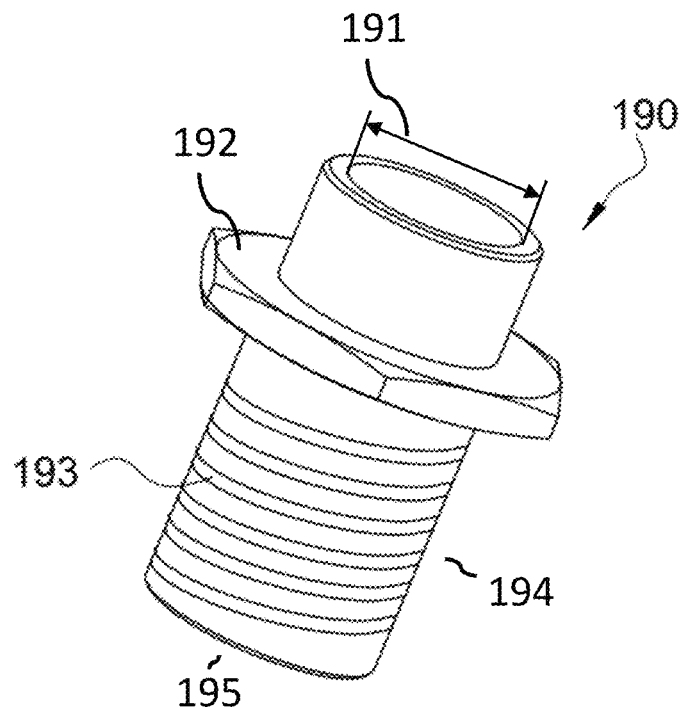
Figure 20:
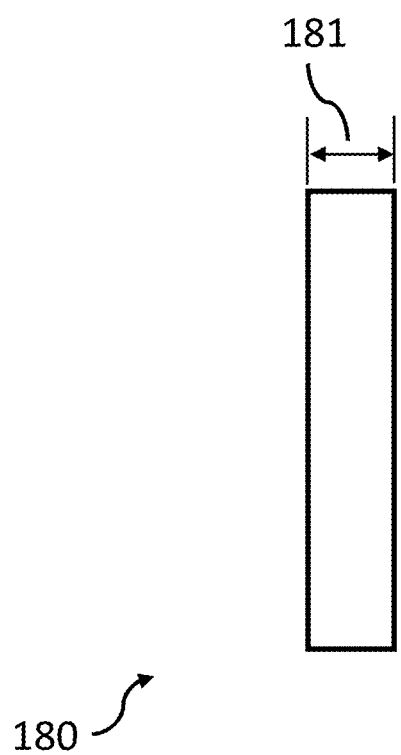

FIG. 17, 18, 19, 20, the secondary pressure management assembly (170) as per the present invention comprises a
  an energy accumulator
  A stud (180)
  A dynamic support (190)

The energy accumulator in a preferred embodiment is a compression spring (171) with a prescribed internal diameter (172). The dynamic support (190) is a hollow tubular cylinder (195) with an internal tubular diameter (191), having a peripheral platform (192) and a spiral cut (193) all along an external tubular wall (194) so as to threadingly retain the compression spring (171) with the prescribed internal diameter (172). The stud (180) is of a stud diameter (181), the stud diameter (181) being less than the tubular diameter (191) as prescribed.

A spring assisted telescopic arrangement is formed by assembling the compression spring (171) on the stud (180) and the dynamic support (190).

The secondary management assembly (170) is disposed between the first anchor (57) in the diaphragm cover (50) and the second anchor (137) in the configurable diaphragm arrangement (100).

The pressure operated fluid valve (10) as per the present invention is provided with the secondary pressure management assembly (170) with different compression springs (171) as per pressure parameters of application, and importantly an active or free turns of any compression spring (171) provided in a valve can be altered by increasing or decreasing engagement of corresponding numbers of turns in the spiral cut (193), during installation and commissioning of the valve. Also, an active length of any compression spring (171) provided in a valve can be altered by increasing or decreasing engagement of corresponding numbers of turns in the spiral cut (193), during installation and commissioning of the valve. Such flexibility of changing the compression spring (171), and changing compressive force of the compressive spring, resulting in the manipulation of the resistive force (160) in situ is a significant flexibility for deployment of the pressure operated fluid valve (10) as per present invention for installations of different pressure parameters.

Figure 21:
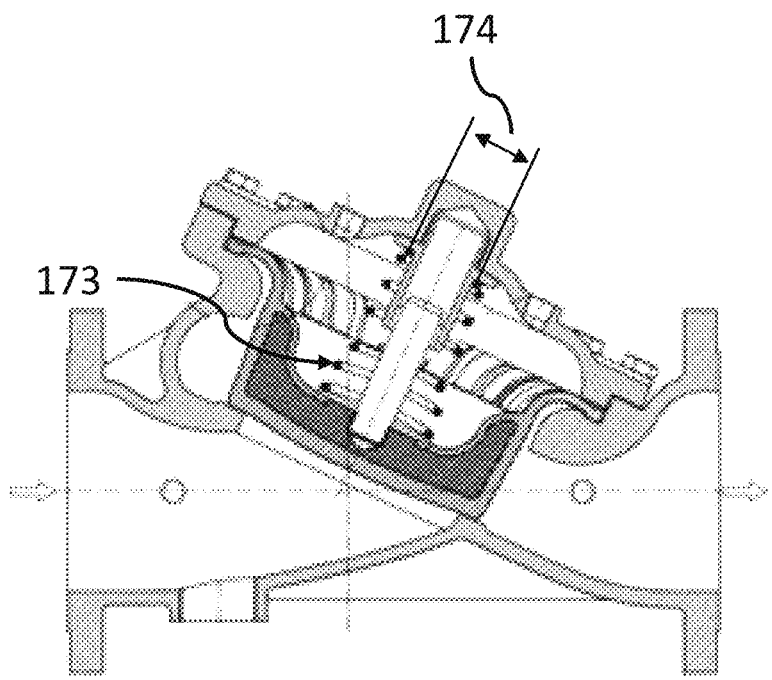
FIG. 21 is a sectional view of the pressure operated fluid valve with another embodiment of the secondary pressure management assembly.

FIG. 21, as a variation, the energy accumulator is a conical compression spring (173) with a prescribed minimum internal diameter (174).

Figure 22A:
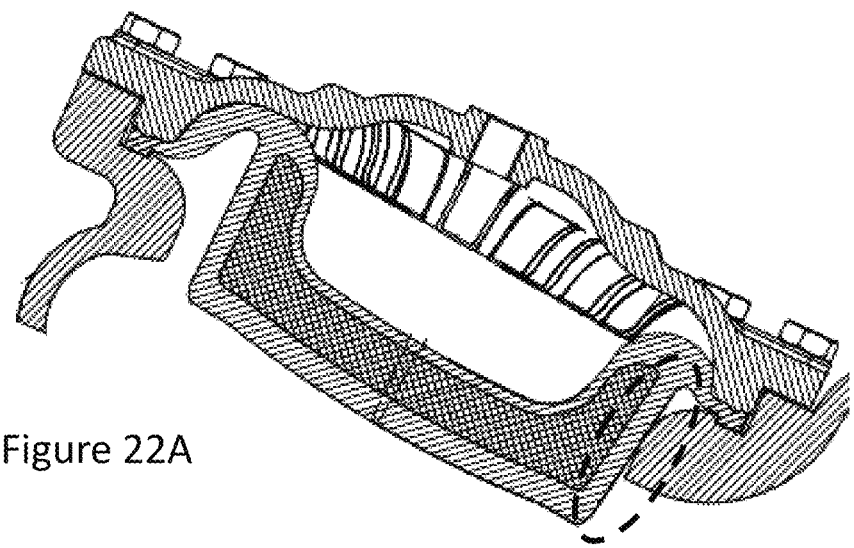
FIG. 22A shows a sectional view of the pressure operated fluid valve without the secondary pressure management assembly, while FIG. 22B comparatively shows a sectional view of the pressure operated fluid valve with the secondary pressure management assembly.
Figure 22B:
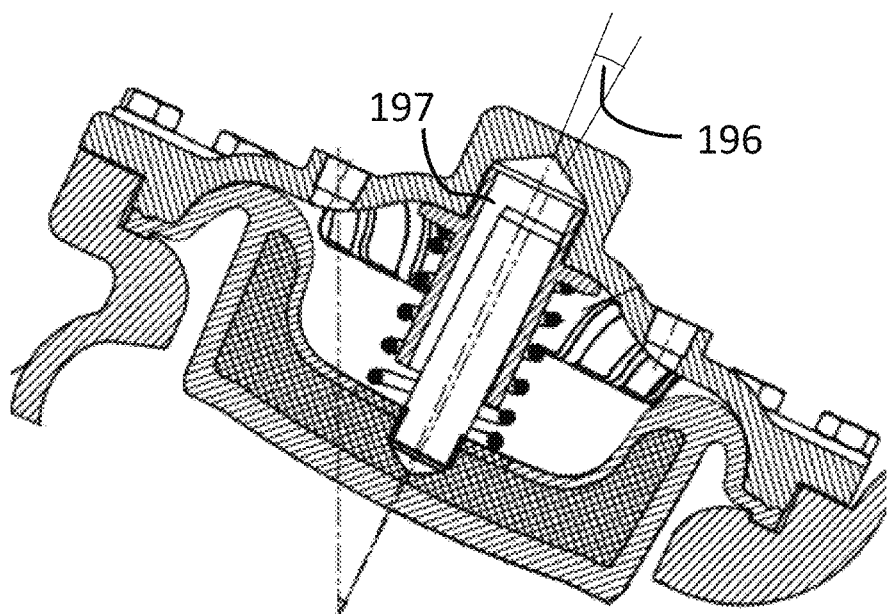

FIG. 22A, while a clear space between an outer surface of the configurable diaphragm and inner circumferential surface of the main fluid flow chamber is maintained by design in order to reduce operational friction and wear, the clapo-diaphragm does move up and down in a micro zig-zag manner due to pressure pulsations, and thus there exists a possibility of the diaphragm actually touching the inner circumferential surface (24) during close and open operations (see dotted encircled part), getting excessively wear and or getting stuck in one of the positions. On the other hand, an attempt to completely prevent such pulsating and or skewed movement can also result in excessive stresses in the clapo-diaphragm resulting in wear and reducing its operational life. The present invention finds a solution by permitting a minimum degree of freedom of the stud (180) in the dynamic support (190), which gradually reduces as the stud (180) telescopes in the dynamic support (190). In other words, while the secondary pressure management assembly (170) does restrict a skewed movement during the closing and the opening of the pressure operated fluid valve (10) as per the present invention, the intentional and prescribed "play" between the dynamic support and the stud (180) acts as a reliever of undue stresses. FIG. 22B, the stud diameter (181) being less than the tubular diameter (191), as prescribed, restricts to a prescribed degree an angular freedom (196) of the sealing portion (130) of the configurable diaphragm arrangement (100). At the same time, the stud diameter (181) being less than the tubular diameter (191), as prescribed, permits a lateral shift (197) of the stud (180) inside the dynamic support (190). Essentially, the clear peripheral space (14) is maintained to a non-zero value throughout life of the valve as per the present invention during the open and close operations of the pressure operated fluid valve (10). Such clear peripheral space (14) is comparable to a difference between the internal tubular diameter (191) and the stud diameter (181), An engineering co-ordination of operating pressure, linear travel of the sealing portion and the resistive force (160) results in an effective deployment of the pressure operated fluid valve (10) of the present invention.

Figure 23:
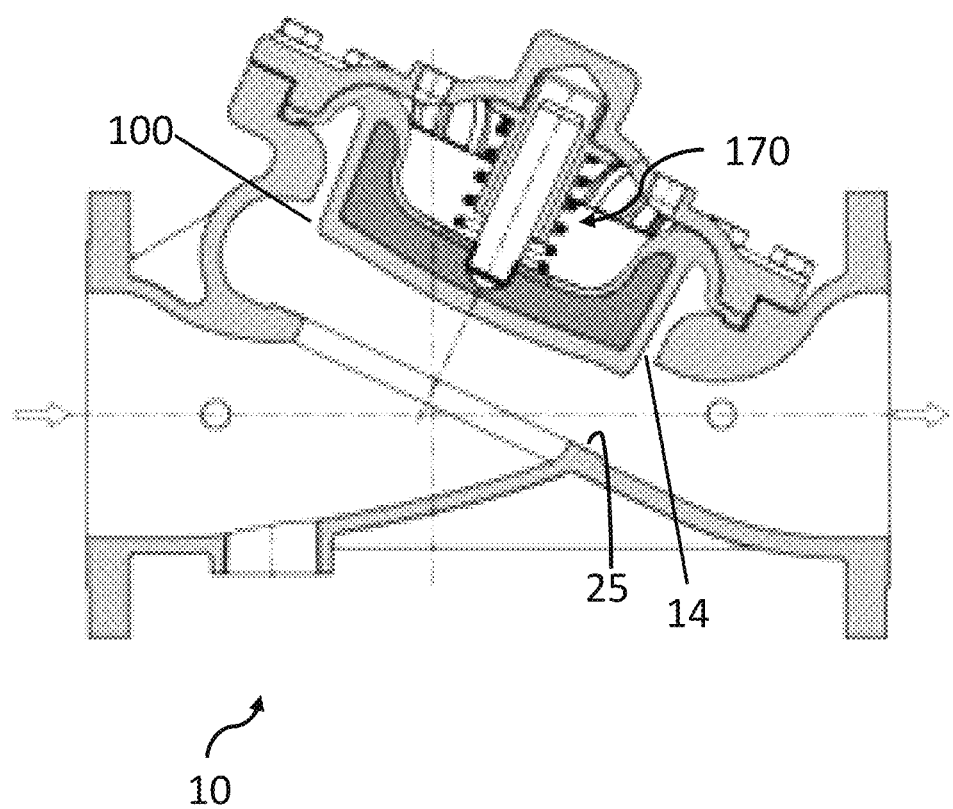
FIG. 23 is a sectional view of the pressure operated fluid valve in an open position.

FIG. 23, with such engineering coordinated pressure operated fluid valve (10) with coordinated diaphragm arrangement (100) augmented with the secondary pressure management assembly (170) results in a complete opening and proper closing of the valve over an extended life and with low maintenance services, eventually reducing cost over life cycle of the installation. The valve can be re-calibrated for enhanced system pressure due to upgradations and expansions of installations, further adding economic significance of the invention.

What is claimed is:

1. A pressure operated fluid valve (10) with a configurable diaphragm arrangement (100), comprising a main fluid flow chamber (20) having a diaphragm gate (21), a seat (22), a first profile holder (23); a diaphragm cover (50) having a second profile (53); a diaphragm; the pressure operated fluid valve (10) forming an upstream side (11), a downstream side (12), a diaphragm side (13); characterized by:
 a configurable diaphragm arrangement (100) consisting of
  A flexible profile (110),
   A sealing portion (130) having a metallic insert (131) encapsulated in a natural or a synthetic rubber, the sealing portion (130) having a combination profile (140) consisting of
    a first curvatured profile (132),
    a second curvatured profile (133),
    a third curvatured profile (134), and a fourth curvatured profile (135) forming an outwardly convex profile, the fourth curvature profile (135) having a peripheral flat end (139), and
   a pressure management profile (150) on an inside curvilinear surface (114) of the flexible profile (110);
the flexible profile (110) forms a flexible link allowing the sealing portion (130) to move up and down in the main fluid flow chamber (20), the configurable diaphragm arrangement (100) disposed in the main fluid flow chamber (20) by a first end (112) of the flexible profile (110) securely trapped between the first holder profile (23) and the second holder profile (53) such that there is a clear peripheral space (14) between an outer surface (113) of the clapo-diaphragm (100) and inner circumferential surface (24) of the main fluid flow chamber (20); has a first anchor (57) in the diaphragm cover and a second anchor (137) in the inner base of the configurable diaphragm arrangement (100).

2. The pressure operated fluid valve (10) with the configurable diaphragm arrangement (100) as claimed in claim 1, wherein the configurable diaphragm arrangement (100) further comprises a secondary pressure management assembly (170) comprising:
 an energy accumulator, wherein the energy accumulator is a compression spring (171) with a prescribed internal diameter (172),
 a dynamic support (190) having a hollow tubular cylinder (195) of an internal tubular diameter (191), with a peripheral platform (192) and a spiral cut (193) all along an external tubular wall (194) so as to threadingly retain the compression spring (171) with the prescribed internal diameter (172), and
 a stud (180) of a stud diameter (181), the stud diameter (181) being less than the internal tubular diameter (191) as prescribed,
the secondary management assembly (170) disposed between the first anchor (57) in the diaphragm cover (50) and the second anchor (137) in the configurable diaphragm arrangement (100).

3. The pressure operated fluid valve (10) with the configurable diaphragm arrangement (100) as claimed in claim 2, wherein the clear peripheral space (14) is maintained to a non-zero value comparable to a difference between the internal tubular diameter (191) and the stud diameter (181), during an open and close operation of the pressure operated fluid valve (10).

4. The pressure operated fluid valve (10) with the configurable diaphragm arrangement (100) as claimed in claim 2, wherein the energy accumulator is a conical compression spring (173) with a prescribed minimum internal diameter (174).

5. The pressure operated fluid valve (10) with the configurable diaphragm arrangement (100) as claimed in claim 2, wherein the stud diameter (181) being less than the tubular diameter (191) as prescribed restricts to a prescribed degree of angular freedom (196) of the sealing portion (130) of the configurable diaphragm arrangement (100).

6. The pressure operated fluid valve (10) with the configurable diaphragm arrangement (100) as claimed in claim 2, wherein the stud diameter (181) being less than the tubular diameter (191) as prescribed permitting a lateral shift (197) of the stud (180) inside the dynamic support (190).

7. The pressure operated fluid valve (10) with the configurable diaphragm arrangement (100) as claimed in claim 2, wherein the energy accumulator is configured by altering an active turns by increasing or decreasing engagement of corresponding numbers of turns in the spiral cut (193), particularly during installation and commissioning of the fire protection valve (10).

8. The pressure operated fluid valve (10) with the configurable diaphragm arrangement (100) as claimed in claim 2, wherein the energy accumulator is configured by altering an active length by increasing or decreasing engagement of corresponding numbers of turns in the spiral cut (193), particularly during installation and commissioning of the fire protection valve (10).

9. The pressure operated fluid valve (10) with the configurable diaphragm arrangement (100) as claimed in claim 1, wherein the pressure management profile (150) is a plurality of trapezoidal ribs (151), an either end of each trapezoidal rib (151) tapering out to merge with the curvilinear portion of the configurable diaphragm arrangement (100), a pitch P of the ribs is multiple of the top width A of the ribs to the order of 1 to 1.5 and a rib height H3 1 to 1.5 times of a base height H2.

10. The pressure operated fluid valve (10) with the configurable diaphragm arrangement (100) as claimed in claim 1, wherein the pressure management profile (150) is a corrugated rib profile (152), wherein an outside curvilinear surface (112B) follows the profile of the trapezoidal cross-sectional ribs (151) on the inside curvilinear surface (112A), resulting in the corrugated rib profile (152) having a reduced exposed surface area to interact with the inner circumferential surface (24) of the main fluid flow chamber (20), resulting in reduced friction and wear.

11. The pressure operated fluid valve (10) with the configurable diaphragm arrangement (100) as claimed in claim 10, wherein the corrugated rib profile (152) a pitch P1 varying from A1 to twice A1, a pitch P2 varying from A2 to twice the A2, a thickness T1 varying from 0 to half of H2, a thickness T2 varying from 0 to half of a gross thickness H4, and the gross thickness H4 varying from 0 to three times the H2.

12. The pressure operated fluid valve (10) with the configurable diaphragm arrangement (100) as claimed in claim 1, wherein the pressure management profile (150) is one of a plurality of semi-circular ribs, a combination of trapezoidal ribs (151) and semi-circular ribs, and any projecting shaped ribs of a top width, a rib height H3 and a base height H2.

13. The pressure operated fluid valve (10) with the configurable diaphragm arrangement (100) as claimed in claim 1, wherein the combination profile (140) due to a fluidic pressure/pressure pulsations Pr transiently bulges out to a swelled convex profile (140A) resulting into an additional force Fr on a sealing seat (25) proportional to an interface width (136) at the peripheral flat end (139).

14. The pressure operated fluid valve (10) with the configurable diaphragm arrangement (100) as claimed in claim 1, wherein the fire protection valve opens and closes by a linear travel (15) of the sealing portion 130) of the configurable diaphragm arrangement (100), a first portion (110A) and a second portion (130A) forms a gapless contiguous sealing (120) when the valve is fully open.

* * * * *